United States Patent [19]
Benck et al.

[11] Patent Number: 5,191,544
[45] Date of Patent: Mar. 2, 1993

[54] PERSONAL COMPUTER ENCLOSURE WITH SHIELDING

[75] Inventors: Jeffrey W. Benck, Delray Beach; James W. Deiso, Boca Raton; Jose E. Richards, Deerfield Beach; Brian A. Trumbo, Boynton Beach, all of Fla.

[73] Assignee: International Business Machines Corp., Armonk, N.Y.

[21] Appl. No.: 538,438

[22] Filed: Jun. 15, 1990

[51] Int. Cl.⁵ .......................... G06F 1/00; H05K 9/00
[52] U.S. Cl. .................................. 364/708; 174/35 R; 361/424
[58] Field of Search ................ 364/708; 361/424, 384; 174/35 R

[56] References Cited

U.S. PATENT DOCUMENTS

| | | | |
|---|---|---|---|
| 4,901,205 | 2/1990 | Landis et al. | 174/35 R |
| 4,937,771 | 6/1990 | Rumps, Jr. et al. | 364/708 |
| 5,021,763 | 6/1991 | Obear | 364/708 |
| 5,045,638 | 9/1991 | Wada et al. | 174/35 R |
| 5,047,898 | 9/1991 | Cooke et al. | 361/424 |
| 5,067,041 | 11/1991 | Cooke et al. | 361/424 |
| 5,136,465 | 8/1992 | Benck et al. | 361/384 |

FOREIGN PATENT DOCUMENTS

| | | | |
|---|---|---|---|
| 0189796 | 8/1986 | European Pat. Off. | 307/91 |
| 0288000 | 10/1988 | European Pat. Off. | |
| 3732885 | 1/1989 | Fed. Rep. of Germany. | |

OTHER PUBLICATIONS

"Kühlt und Schirmt Gehänse für die Mikrocomputer-technik", *Electrotechnik*, No. 3, Feb. 1988, pp. 24-26.

*Primary Examiner*—Long T. Nguyen
*Attorney, Agent, or Firm*—Daniel E. McConnell

[57] ABSTRACT

This invention relates to personal computers, and more particularly to the provision of shielding for attenuating the emission of electromagnetic radiation and the like from an enclosure for such computers. A personal computer in accordance with this invention has a chassis for mounting a planar board and having a base, a front panel, and a rear panel. The front panel defines at least one bay for receiving a data storage device. In order to attenuate the emission of electromagnetic radiation through the windows formed for the bays in the front panel of the chassis, this invention contemplates that at least one manually removable shield member will be mounted in any bay.

16 Claims, 6 Drawing Sheets

PERSONAL COMPUTER ENCLOSURE WITH SHIELDING

FIELD AND BACKGROUND OF INVENTION

This invention relates to personal computers, and more particularly to the provision of shielding for attenuating the emission of electromagnetic radiation and the like from an enclosure for such computers.

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 50, 60, 70 and 80.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 80. The Family I models typically have used the popular INTEL 8088 or 8086 microprocessor as the system processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

It is well known that the components of a personal computer housed within an enclosure and supported from the chassis or connected with the planar board are capable of emitting electromagnetic radiation at various frequencies and that standards have been established for limiting the emission of such energy to various limits depending on the environment of use of the computer. Further, it is known that higher speed processors and circuits associated with such processors, such as those specifically mentioned above, typically emit radiation of differing frequencies and amounts than the earlier designed, slower processors. Heretofore, shielding has been accomplished in various ways, including providing metal enclosures and/or coating or lining the enclosures and covers provided. In achieving shielding in these ways, and attenuating radiation, it has been noted that openings provided in such enclosures and covers can present particularly difficult problems in shielding.

It has also become desirable to provide for the possibility that a personal computer may be provided with direct access storage devices such as magnetic disk, optical disk, tape backup, and other drives. In making provision for such additions, the chassis and enclosure for a personal computer may be provided with areas, known as "bays", designed to receive and accommodate additional devices. While such bays provide flexibility in arranging the components of a personal computer, they also present additional openings to be dealt with in arranging shielding.

As the development of personal computer technology has advanced, personal computers have been enabled to incorporate increasingly higher data handling speeds in processors, data storage devices, and memory. Such higher speeds bring with them greater emission of electromagnetic radiation, increasing the demands placed on enclosures for the attenuation of such emissions. Other terms used to refer to such requirements have been electromagnetic compatibility and the suppression of electromagnetic interference. In efforts to bring emissions within the required standards while attaining the sought for high speeds, designs have moved toward a completely grounded enclosure with minimal gaps and openings.

BRIEF DESCRIPTION OF INVENTION

With the foregoing particularly in mind, it is an object of this invention to permit enhanced flexibility in selecting and installing direct access storage devices (DASD) for a personal computer while maintaining suitable shielding against emission of electromagnetic radiation. In realizing this object of the present invention, bays for receiving additional devices are defined in a chassis and manually removable shield members are mounted in the chassis bay windows for attenuating the emission of electromagnetic radiation. The manually removable characteristic of the shield members enables the ready preparation of the bay for mounting of a device to be added.

Yet a further object of the invention is to assure that the users and environment of use of a personal computer are protected against undue electromagnetic emissions. In realizing this object of the present invention, shield members are installed on the windows of bays formed in the chassis of a personal computer and are retained in place by the provision of certain relationships among the clearances provided between an enclosure or cover and the shield members.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
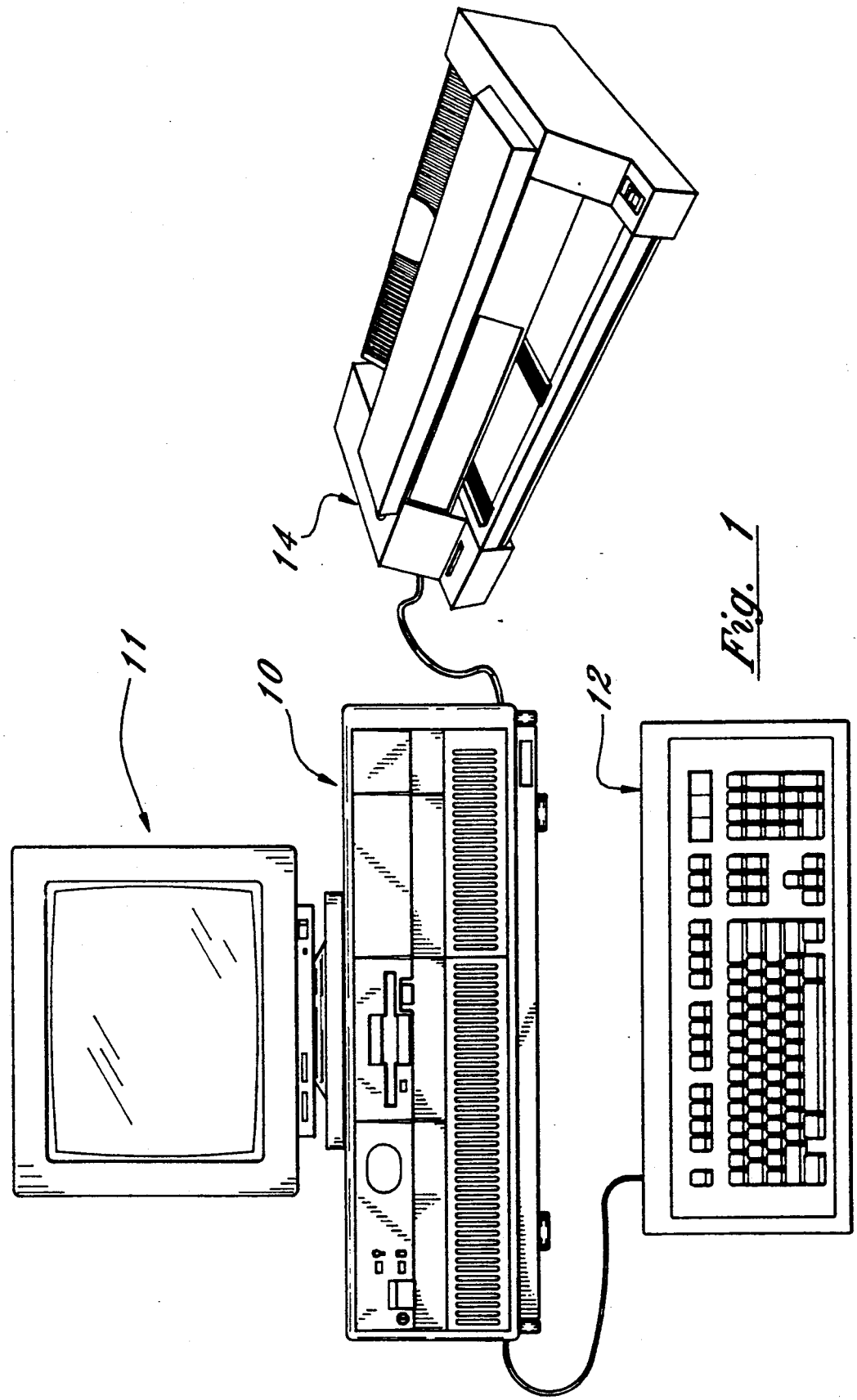
FIG. 1 is a perspective view of a personal computer embodying this invention.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a planar 20 which is mounted on the chassis 19 and provides a means for electrically interconnecting the components of the computer 10 including those identified above and such other associated elements as floppy disk drives, various forms of direct access storage devices, accessory cards or boards, and the like.

Figure 2:
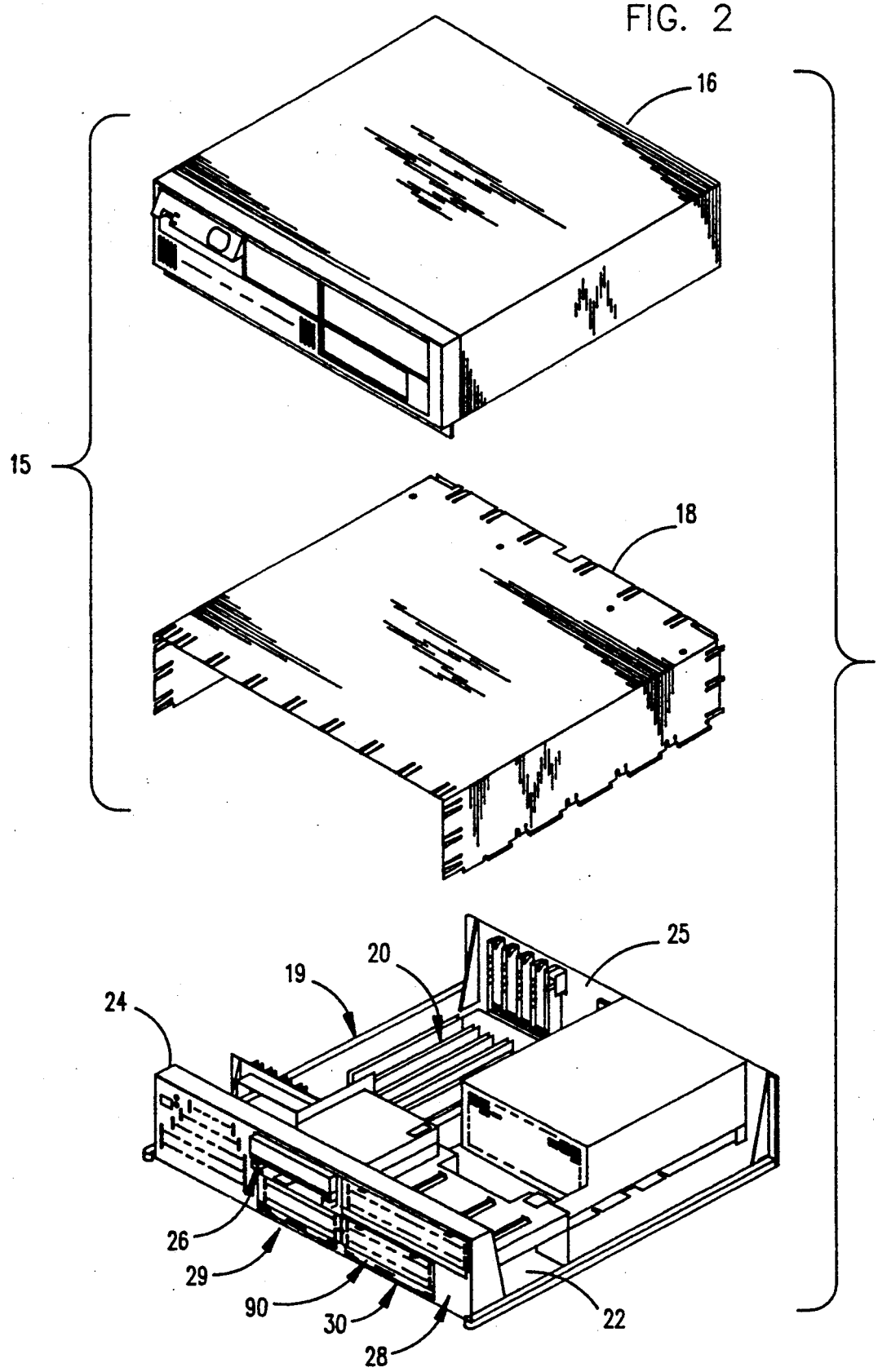
FIG. 2 is an exploded perspective view of certain elements of the personal computer of FIG. 1 including a chassis, a cover, an electromechanical direct access storage device and a planar board and illustrating certain relationships among those elements.

The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch).

Figure 3:
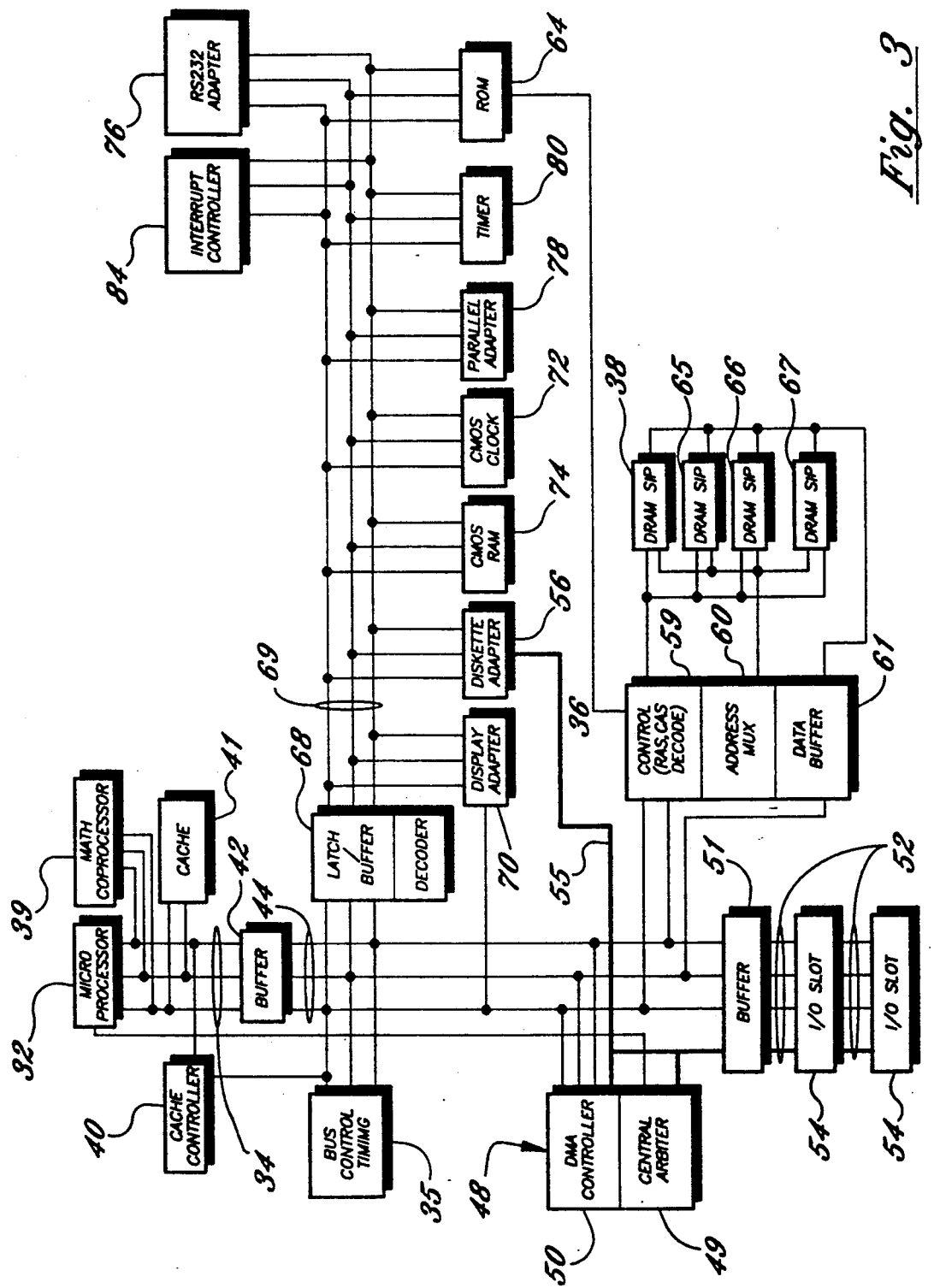
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80386 which is sold by INTEL.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and a further buffer 68. The system bus 44 is further connected to a bus control and timing unit 35 and a DMA unit 48. The DMA unit 48 is comprised of a central arbitration unit 49 and DMA controller 50. The buffer 51 provides an interface between the system bus 44 and an optional feature bus such as the MICRO CHANNEL bus 52. Connected to the bus 52 are a plurality of I/O slots 54 for receiving MICRO CHANNEL adapter cards which may be further connected to an I/O device or memory.

An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexor 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic is used to reclaim RAM previously occupied by BIOS. Further generated by memory controller 36 is a ROM select signal (ROMSEL), that is used to enable or disable ROM 64.

While the microcomputer system 10 is shown with a basic 1 megabyte RAM module, it is understood that additional memory can be interconnected as represented in FIG. 3 by the optional memory modules 65 through 67. For purposes of illustration only, the present invention is described with reference to the basic one megabyte memory module 38.

A latch buffer 68 is coupled between the system bus 44 and a planar I/O bus 69. The planar I/O bus 69 includes address, data, and control components respectively. Coupled along the planar I/O bus 69 are a variety of I/O adapters and other components such as the display adapter 70 (which is used to drive the monitor 11), a CMOS clock 72, nonvolatile CMOS RAM 74 herein after referred to as NVRAM, a RS232 adapter 76, a parallel adapter 78, a plurality of timers 80, a diskette adapter 56, an interrupt controller 84, and a read only memory 64. The read only memory 64 includes the BIOS that is used to interface between the I/O devices and the operating system of the microprocessor 32. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e. BIOS is executed out of RAM). The clock 72 is used for time of day calculations and the NVRAM is used to store system configuration data. That is, the NVRAM will contain values which describe the present configuration of the system. For example, NVRAM contains information describing the capacity of a fixed disk or diskette, the type of display, the amount of memory, time, date, etc. Of particular importance NVRAM will contain data (can be one bit) which is used by memory controller 36 to determine whether BIOS is run out of ROM or RAM and whether to reclaim RAM intended to be used by BIOS RAM. Furthermore, these data are stored in NVRAM whenever a special configuration program, such as SET Configuration, is executed. The purpose of the SET Configuration program is to store values characterizing the configuration of the system to NVRAM.

As mentioned hereinabove, the computer has a cover indicated generally at 15 which cooperates with the chassis 19 in forming an enclosed, shielded volume for containing the above identified components of the microcomputer. The cover preferably is formed with an outer decorative cover member 16 which is a unitary molded component made of a moldable synthetic material and a metallic thin sheet liner 18 formed to conform to the configuration of the decorative cover member. However, the cover can be made in other known ways and the utility of this invention is not limited to enclosures of the type described.

In order to attenuate the emission of electromagnetic radiation through the windows formed for the bays 26, 28, 29, 30 in the front panel 24 of the chassis, this invention contemplates that at least one manually removable shield member will be mounted in the open bay. Preferably, and as illustrated, a plurality of such members are provided where the computer chassis provides a plurality of bays. In the illustrated form, two of the four bays shown have corresponding shield members mounted therein. In the illustrated embodiment of the invention, one bay 28 which is capable of mounting 5.25 inch drives is also capable of mounting a 3.5 inch drive, and the shield members provided accommodate this variance, as pointed out more fully hereinafter.

Figure 4:
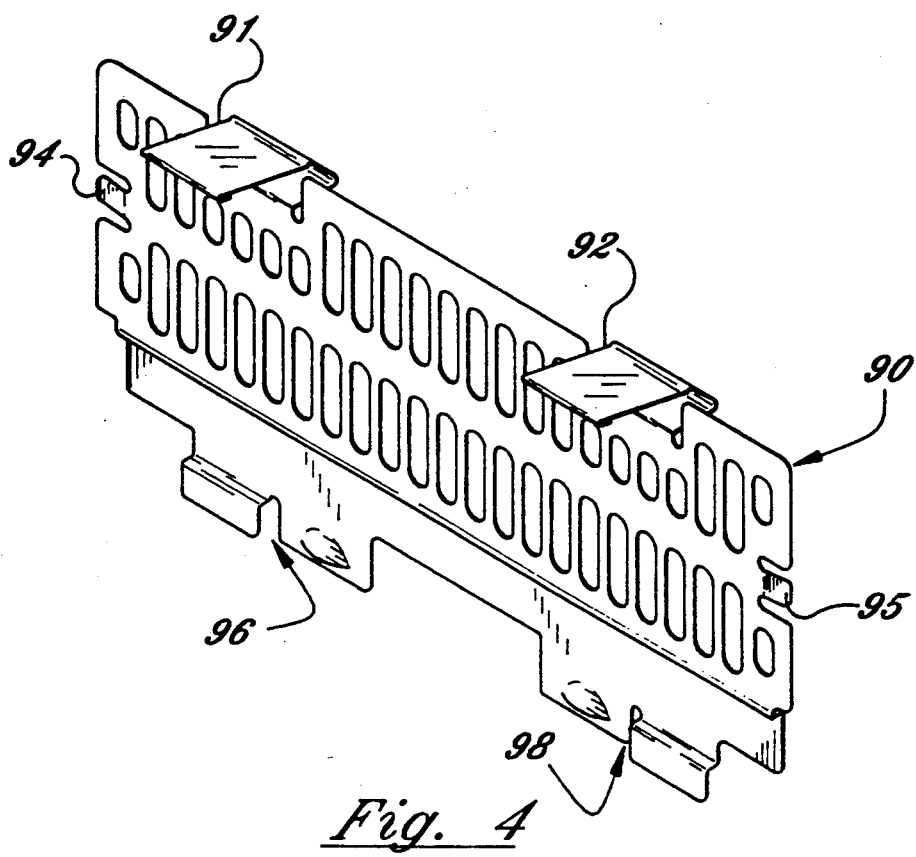
FIG. 4 is a perspective view of a first form of electromagnetic shield in accordance with this invention.
Figure 5:
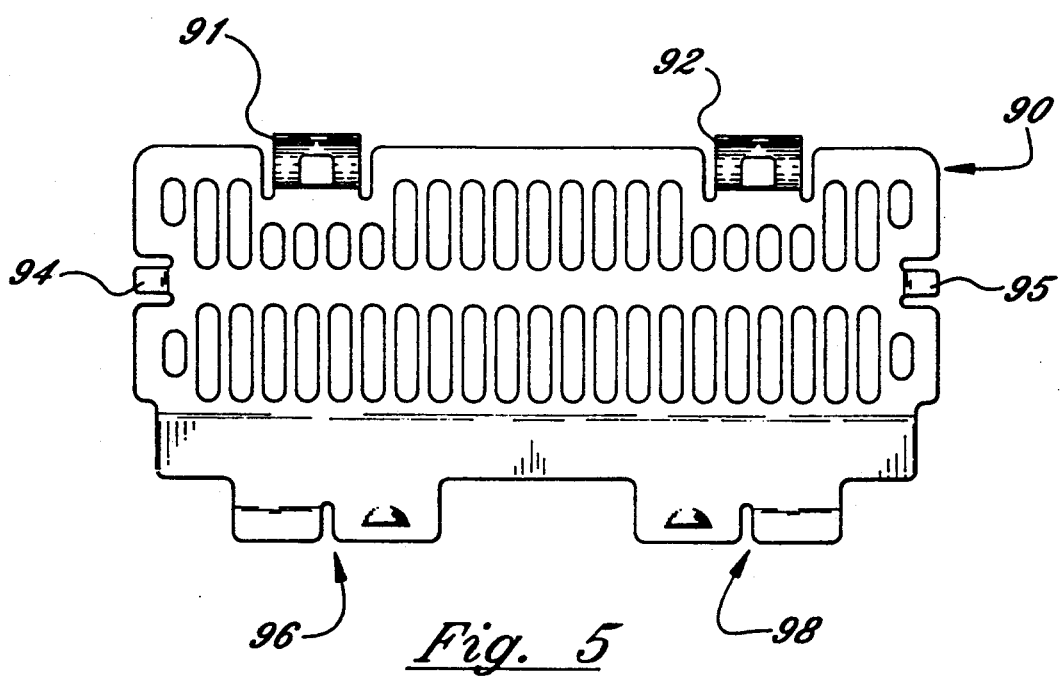
FIG. 5 is an elevation view of the shield of FIG. 4.

Referring now to the shield members for the lower bays 29, 30, a shield member 90 is preferably mounted in the window of the chassis front panel 24 which defines one bay opening 30. The shield member 90, as shown, may be placed in either window and preferably two such members are provided and mounted in the two windows where either no data storage devices are mounted in the bays or the devices mounted need not be user accessible devices. The shield member 90 is formed of a thin sheet metal material such as stainless steel, and is in electrical contact with the front panel 24 which is also formed of a conductive metal or similar material. It is the electrical contact, in part, which assures the shielding sought by this invention. The shield member 90 for the lower bay windows (FIGS. 4 and 5) has a generally rectangular shape for fitting within the generally rectangular window of a bay opening to be shielded and at least one manipulable lever portion normally biased toward engagement with the front panel 24, when installed in a corresponding window. In the form shown, the shield member 90 has two lever portions 91, 92. The member 90 also has a pair of oppositely directed spring tab portions 94, 95 extending perpendicularly to the lever portions 91, 92 for engaging the front panel 24 at edges of the window and thereby for establishing conductive paths between the shield member 90 and the front panel 24. In order to engage the lower edge of the window and provide for securing the lower edge of the shield member 90, the lower edge thereof has two pairs of depending legs 96, 98. One leg of each pair is fitted within the front panel 24 when the member 90 is in place, and the other is fitted against the outer face of the front panel.

In order to accommodate the free circulation of ambient air through the bays, the member 90 is provided with an arrangement of louvered openings. As will be observed by a knowledgeable reader, the relative positions of the openings; legs 96, 98; tabs 94, 95; and levers 91, 92 is such that conductive pathways exist across the face of the shield member and the relative spacing of the open areas is such that electromagnetic radiation o undesirable frequencies is attenuated.

Turning now to the upper bays 26, 28, one of the bays is usually occupied by the at least one user accessible data storage device such as a floppy disk drive which is necessary and appropriate for a free standing personal computer to be operable. Thus such a bay need not be shielded, being occupied by a device as to which a user of the personal computer will be inserting and removing media. The other bay, in the illustrated embodiment, is prepared to accept either a 5.25 drive or a 3.5 drive. As a consequence, the shield provided for that bay is formed by two members. Together, the members span the distance necessary to cover the open window appropriate for a 5.25 drive. However, should a narrower 3.5 drive be installed, a shorter one of the two members is retained in place to shield the otherwise open portion of the window formed in the front panel 24.

Figure 6:
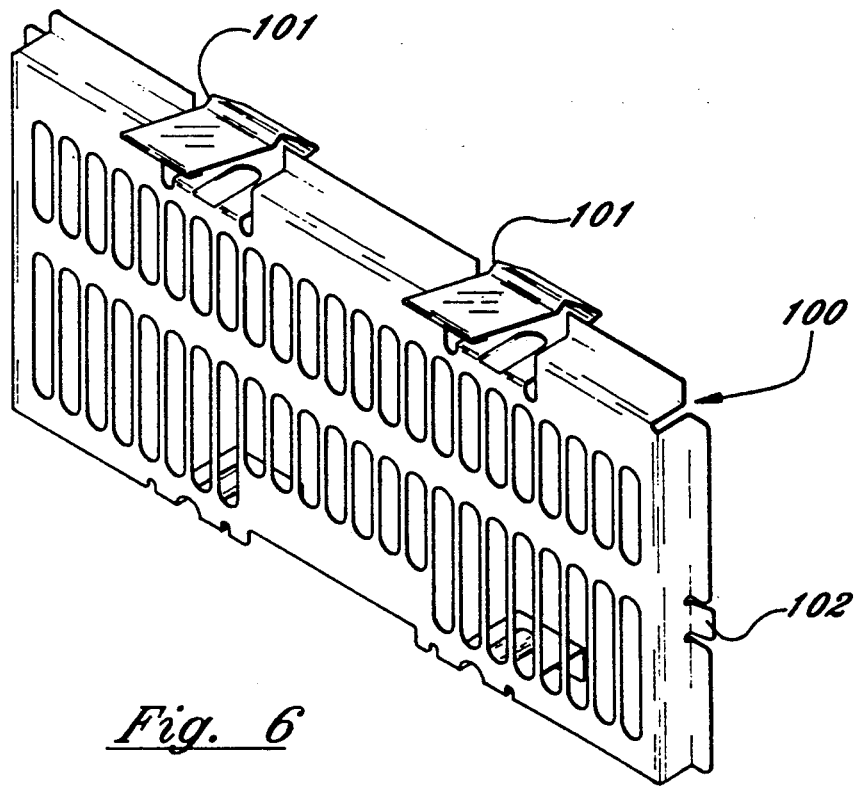
FIG. 6 is a perspective view of a second form of electromagnetic shield in accordance with this invention.
Figure 7:
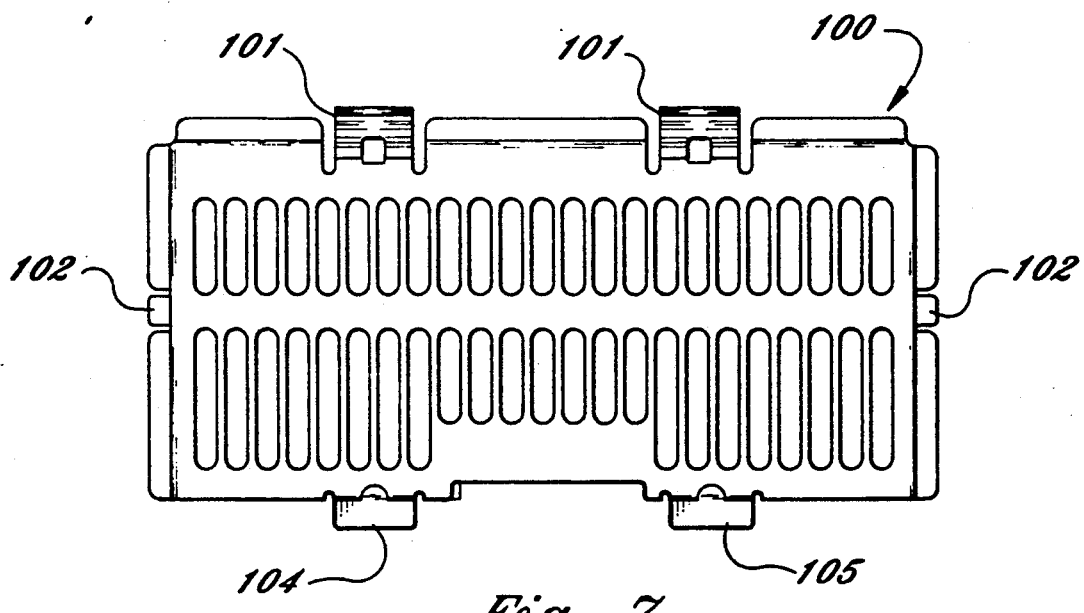
FIG. 7 is an elevation view of the shield of FIG. 6.

In the illustrated embodiment, the upper bay shield members have substantial similarities to the previously described lower bay member 90. The narrower of the two members is not shown, being substantially similar to the member shown in FIGS. 4 and 5. The longer of the two members is shown in FIGS. 6 and 7 and there indicated at 100. Each of the members has at least one lever portion (101 for member 100); at least one tab portion (102); and depending legs (104 and 105). However, because of dimensional differences in the personal computer for which the illustrated embodiment was developed, at least one of the upper bay shield members (here, the member 100) has extension or boxed portions folded backward from the front face of the shield in such a way as to form extensions and provide a certain depth to the shield.

Figure 8:
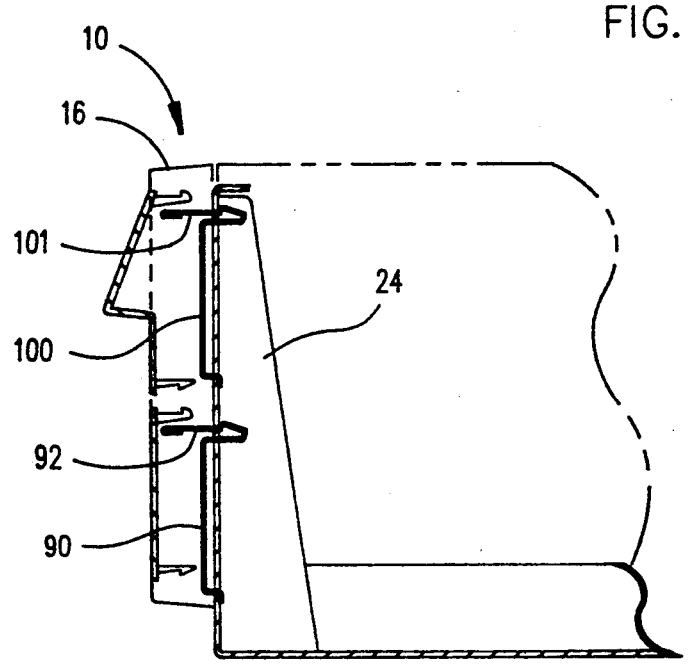
FIG. 8 is an elevation view, in section, through a portion of the personal computer of FIG. 1.

There is a particular relationship between the cover 15 and the shield members 90, 100. Preferably, the cover is sized relative to the chassis 19 and the lever portions of the shield members such that the inner surface of the cover 15, when positioned on the chassis 19, comes sufficiently close to the free ends of the lever portions as to preclude any accidental dislodgement of the shield members during shipment or handling of the computer (FIG. 8).

As will be understood from the foregoing description, the present invention provides for shielding the openings in an enclosure which otherwise fully encloses a personal computer by shield members which may be readily manually installed or removed, thereby facilitating installation or removal of data storage devices while maintaining a high level of attenuation of electromagnetic emissions. In the drawings and specifications there has been set forth a preferred embodiment of the invention and, although specific terms are used, the description thus given uses terminology in a generic and descriptive sense only and not for purposes of limitation.

What is claimed is:

1. A microcomputer comprising:
   a chassis for mounting a planar board and having a base, a front panel and a rear panel,
   a cover for engaging said chassis and forming with said chassis an enclosed, shielded volume for containing components of the microcomputer,
   said front panel defining at least one bay for receiving a data storage device, and
   a manually removable shield member mounted in said bay for attenuating the emission of electromagnetic radiation therethrough.

2. A microcomputer according to claim 1 wherein said shield member defines an array of air flow openings therein for passage of ambient air therethrough and through said bay.

3. A microcomputer according to claim 2 wherein said front panel and said shield member are fabricated of an electrically conductive metal and further wherein said shield member is in electrical contact with said front panel.

4. A microcomputer according to claim 2 wherein said shield member has at least one manipulable lever portion normally biased toward engagement with said front panel at an edge of said bay, said lever portion upon manipulation enabling disengagement of said shield member from said front panel and removal thereof from said bay.

5. A microcomputer according to claim 4 wherein said shield member has a pair of oppositely directed spring tab portions extending perpendicularly to said lever portion for engaging said front panel at edges of said bay and thereby for establishing electrically conductive paths between said shield member and said front panel.

6. A microcomputer according to claim 1 wherein said cover comprises a main wall portion, a pair of sidewall portions extending perpendicular to said main wall portion for wrapping around sides of the microcomputer, and a front wall portion extending perpendicular to said main wall and sidewall portions for concealing said front panel and said shield member from view when said cover engages said chassis.

7. A microcomputer according to claim 6 wherein said shield member defines an array of air flow openings therein for passage of ambient air therethrough and through said bay.

8. A microcomputer according to claim 6 wherein said front panel and said shield member are fabricated of an electrically conductive metal and further wherein said shield member is in electrical contact with said front panel.

9. A microcomputer according to claim 8 wherein said shield member has a pair of oppositely directed spring tab portions extending perpendicularly to said lever portion for engaging said front panel at edges of said bay and thereby for establishing electrically conductive paths between said shield member and said front panel.

10. A microcomputer according to claim 8 wherein said shield member has at least one manipulable lever portion normally biased toward engagement with said front panel at an edge of said bay, said lever portion upon manipulation enabling disengagement of said shield member from said front panel and removal thereof from said bay.

11. A microcomputer comprising:
    a chassis for mounting a planar board and having a base, a generally planar front panel of electrically conductive metal and a rear panel,
    a cover of non-conductive synthetic material for engaging said chassis and forming with said chassis an enclosed volume for containing components of the microcomputer,
    said front panel defining a plurality of bays each for receiving a data storage device, and
    a plurality of generally planar, manually removable shield members of electrically conductive metal each mounted in a corresponding one of said bays for attenuating the emission of electromagnetic radiation therethrough.

12. A microcomputer according to claim 11 wherein said front panel defines each of said bays to have a generally rectangular opening in the plane of said front panel and further wherein said shield members each have a generally rectangular configuration and are mounted with the planes thereof parallel to the plane of said front panel.

13. A microcomputer according to claim 11 wherein each of said shield members are in electrical contact with said front panel at each edge around the corresponding one of said rectangular openings.

14. A microcomputer according to claim 11 wherein said cover comprises a main wall portion, a pair of sidewall portions extending perpendicular to said main wall portion for wrapping around sides of the microcomputer, and a front wall portion extending perpendicular to said main wall and sidewall portions for concealing said front panel and said shield members from view when said cover engages said chassis, and further wherein said front wall portion when disposed to form with said chassis an enclosed volume is spaced from said front panel at a predetermined distance, and further wherein each of said shield members has at least one manipulable lever portion normally biased toward engagement with said front panel at an edge of the corresponding one of said bays, said lever portion upon manipulation enabling disengagement of said shield member from said front panel and removal thereof from said corresponding one bay, and said lever portion extending said front panel toward said front wall portion for a distance less than said predetermined distance so that said front wall portion blocks said shield member from accidental dislodgement while said cover and chassis are engaged.

15. A microcomputer comprising:
    a chassis for mounting a planar board and having a base, a generally planar front panel of electrically conductive metal and a rear panel,
    a planar board mounted on said chassis,
    a plurality of operating components supported by said chassis and operatively connected with said planar board for together functioning as a personal computer, said components together emitting electromagnetic radiation,
    a cover of non-conductive synthetic material for engaging said chassis and forming with said chassis a shielded, enclosed volume for containing said components of the microcomputer,
    said front panel defining a plurality of bays each for receiving a data storage device, and
    a plurality of generally planar, manually removable shield members of electrically conductive metal each mounted in a corresponding one of said bays and electrically contacting said chassis at a plurality of locations spaced about said corresponding one bay for attenuating the emission of electromagnetic radiation therethrough.

16. A microcomputer having a high speed system processor compatible with application programs and operating system software designed to execute on slower speed system processors and comprising:

a chassis for mounting a planar board and having a base, a generally planar front panel of electrically conductive metal and a rear panel, a planar board mounted on said chassis, a high speed microprocessor having a real and protected mode of operation electrically connected with said planar board and coupled to a high speed data bus;

non-volatile memory electrically connected with said planar board and coupled to a slower speed data bus;

a bus controller electrically connected with said planar board for providing communications between the high speed data bus and the slower speed data bus;

volatile memory electrically connected to the high speed data bus;

a memory controller electrically coupled to said volatile memory and said non-volatile memory, said memory controller regulating communications between said volatile memory and said high speed microprocessor;

a cover of non-conductive synthetic material for engaging said chassis and forming with said chassis a shielded, enclosed volume for containing said microprocessor, memory and controller components of the microcomputer, said front panel defining a plurality of bays each for receiving a data storage device, and a plurality of generally planar, manually removable shield members of electrically conductive metal each mounted in a corresponding one of said bays and electrically contacting said chassis at a plurality of locations spaced about said corresponding one bay for attenuating the emission of electromagnetic radiation therethrough.

* * * * *